(12) United States Patent
Mays et al.

(10) Patent No.: US 8,972,512 B2
(45) Date of Patent: Mar. 3, 2015

(54) MESSAGE DELIVERY SYSTEMS AND METHODS

(71) Applicant: Mail Bypass, Inc., Corte Madera, CA (US)

(72) Inventors: Steve M. Mays, San Rafael, CA (US); Ted B. Knudsen, San Rafael, CA (US); Ian G. Moore, San Rafael, CA (US)

(73) Assignee: Mail Bypass, Inc., Corte Madera, CA (US)

( * ) Notice: Subject to any disclaimer, the term of this patent is extended or adjusted under 35 U.S.C. 154(b) by 232 days.

(21) Appl. No.: 13/631,148

(22) Filed: Sep. 28, 2012

(65) Prior Publication Data

US 2013/0086188 A1 Apr. 4, 2013

Related U.S. Application Data

(60) Provisional application No. 61/541,597, filed on Sep. 30, 2011.

(51) Int. Cl.
*G06F 15/16* (2006.01)
*H04L 12/58* (2006.01)

(52) U.S. Cl.
CPC ...................................... *H04L 51/36* (2013.01)
USPC ............ 709/206; 709/203; 709/217; 709/223

(58) Field of Classification Search
CPC ...... H04I 51/18; H04L 51/36; H04L 51/0063; H04L 51/066
USPC .......................... 709/203, 206, 217, 219, 223
See application file for complete search history.

(56) References Cited

U.S. PATENT DOCUMENTS

| | | | | |
|---|---|---|---|---|
| 5,691,708 A * | 11/1997 | Batchelder et al. | .......... | 340/7.29 |
| 6,381,592 B1 * | 4/2002 | Reuning | ............... | 1/1 |
| 7,177,717 B2 * | 2/2007 | Nakata et al. | ................ | 700/116 |
| 7,289,664 B2 | 10/2007 | Enomoto | | |
| 7,400,624 B2 * | 7/2008 | T V et al. | ...................... | 370/390 |
| 7,496,920 B1 | 2/2009 | Bandhole et al. | | |
| 7,539,728 B2 | 5/2009 | Perepa et al. | | |
| 7,596,620 B1 | 9/2009 | Colton et al. | | |
| 7,653,679 B2 * | 1/2010 | Kantor et al. | ................. | 709/201 |
| 8,082,307 B2 * | 12/2011 | Wallis et al. | ................. | 709/206 |
| 8,448,182 B2 * | 5/2013 | Sengodan | ..................... | 719/312 |
| 2004/0015505 A1 * | 1/2004 | Quick et al. | ................. | 707/100 |
| 2006/0041505 A1 * | 2/2006 | Enyart | ........................... | 705/40 |
| 2006/0164992 A1 * | 7/2006 | Brown et al. | ................. | 370/235 |
| 2007/0055565 A1 * | 3/2007 | Baur et al. | ...................... | 705/14 |
| 2008/0086369 A1 * | 4/2008 | Kiat et al. | ...................... | 705/14 |

(Continued)

OTHER PUBLICATIONS

International Search Report and Written Opinion for co-pending PCT Application No. PCT/US12/58081; mailed on Nov. 29, 2012.

*Primary Examiner* — Lashonda Jacobs
(74) *Attorney, Agent, or Firm* — North Weber & Baugh LLP

(57) ABSTRACT

Embodiments of the present invention include systems and methods for handling large numbers of messages of one or more message types. In embodiments, the scalable messaging system reads from lists of recipient addresses and template messages, mergers them into messages, removes known blacklisted addresses, facilitates the rapid delivery of these messages via a dynamic queuing and dynamic message server deployment, and stores errors and other statistics. In embodiments, the scalable messaging system may include messaging system instances at different locations.

20 Claims, 10 Drawing Sheets

(56) References Cited

U.S. PATENT DOCUMENTS

| | | |
|---|---|---|
| 2008/0114847 A1 | 5/2008 | Ma et al. |
| 2009/0037539 A1* | 2/2009 | Postmus .................... 709/206 |
| 2009/0086278 A1* | 4/2009 | Vendrow et al. ............. 358/402 |
| 2009/0161548 A1 | 6/2009 | Zhu et al. |
| 2009/0177544 A1* | 7/2009 | Sugahara ..................... 705/14 |
| 2009/0233618 A1* | 9/2009 | Bai et al. ..................... 455/453 |
| 2009/0300210 A1 | 12/2009 | Ferris |
| 2010/0057831 A1 | 3/2010 | Williamson |
| 2010/0131590 A1 | 5/2010 | Coleman et al. |
| 2010/0223385 A1 | 9/2010 | Gulley et al. |
| 2010/0250477 A1* | 9/2010 | Yadav ......................... 706/14 |
| 2010/0275131 A1* | 10/2010 | Kunz et al. .................... 715/752 |
| 2011/0119325 A1* | 5/2011 | Paul et al. ..................... 709/203 |
| 2011/0289162 A1 | 11/2011 | Furlong et al. |
| 2012/0167116 A1* | 6/2012 | Chandler et al. ............. 719/314 |
| 2012/0324106 A1* | 12/2012 | Chang et al. ................ 709/224 |
| 2013/0079144 A1* | 3/2013 | Ahmed et al. ................ 463/42 |
| 2013/0304826 A1* | 11/2013 | Li et al. ....................... 709/206 |
| 2014/0023763 A1* | 1/2014 | Krause ........................ 426/407 |
| 2014/0032683 A1* | 1/2014 | Maheshwari et al. ........ 709/206 |

\* cited by examiner

US 8,972,512 B2

MESSAGE DELIVERY SYSTEMS AND METHODS

BACKGROUND

A. Technical Field

The present invention pertains generally to computer applications, and relates more particularly to systems and methods for transmitting significant numbers of messages via one or more networks.

B. Background of the Invention

The prevalence of electronic devices and networks has dramatically increased the connectivity of entities, such as individuals, groups, companies, government organizations, and the like. This infrastructure facilitates several communications means, such as, for example, email, text messaging, social networking, and blogging. Because these various communications means provide an excellent vehicle to reach vast numbers, different organizations have tried to utilized these communication channels. The result has been torrents of messages being transmitted via these various channels. However, this dramatic increase in communication traffic has created signification problems.

First, a significant increase in message traffic can overwhelm a system. If too many messages are requested to be sent at one time, a communications system may become overburdened and may take a significant amount of time to send the messages. And, in some cases, a burst of message traffic can result in system failure.

Second, messaging system providers traditionally have been limited to a specific communication channel. For example, there are messaging providers that specialize in email communication, but they are unable to convey Short Message Service (SMS) messages. Similarly, a system may be able to send facsimile and voice messages but is unable to interface with social networking sites to broadcast messages. Thus, a business wanting to execute a broad messaging campaign must engage multiple messaging providers in order to cover multiple communications channels.

Third, related to the problem of having to engage multiple messaging providers is the issue of coordination. Because multiple, unrelated entities are involved in the messaging campaign, there can be no central coordination, except by the message campaign initiator. However, this entity is typically not well situated to coordinate the events. The entity may have limited access to the necessary data from the messaging providers. And, even if the entity has access to the right data, the entity may be unable to act upon it or get changes implemented in a timely manner. For example, if the entity realizes that there is a problem with a communication channel, the entity can only share that information with the relevant messaging provider or providers. The entity cannot directly fix the problem because the messaging providers are independent third parties. Thus, the entity cannot insure that changes are made in a timely manner. If the messaging campaign is time sensitive, delays in getting the messaging provider to address issues can be catastrophic. Also, the entity must maintain and manage information from each of the different providers. This oversight requires having people that can understand the various communication systems and can analyze the data. However, for many entities, particularly smaller ones, they are unlikely to have people with that capability. A benefit of engaging a third-party messaging service is so that the entity can keep its cost low by not having to bring that expertise and capability in-house. Thus, the coordination aspect is in opposition to using independent messaging services.

Finally, messaging providers typically have to build large dedicated systems. These large systems can allow for heavy messaging traffic; however, they come with significant costs. Because these systems are costly to purchase, to configure, and to operate, the messaging provider must keep the system running at high volume in order to spread the costs. However, messaging traffic is notoriously uneven and bursty. Thus, there will be times when a dedicated system is underutilized and times when it is overcapacity—neither of which yields favorable results. When underutilized, the costs per message increase and may become cost prohibitive. When overcapacity, messaging performance suffers and the messaging campaign initiator may be unsatisfied. This problem is only multiplied when a messaging provider has a dedicated system for each communication mode.

Thus, what is needed are systems and methods for messaging that avoid or mitigate the previous problems of large-scale messaging.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
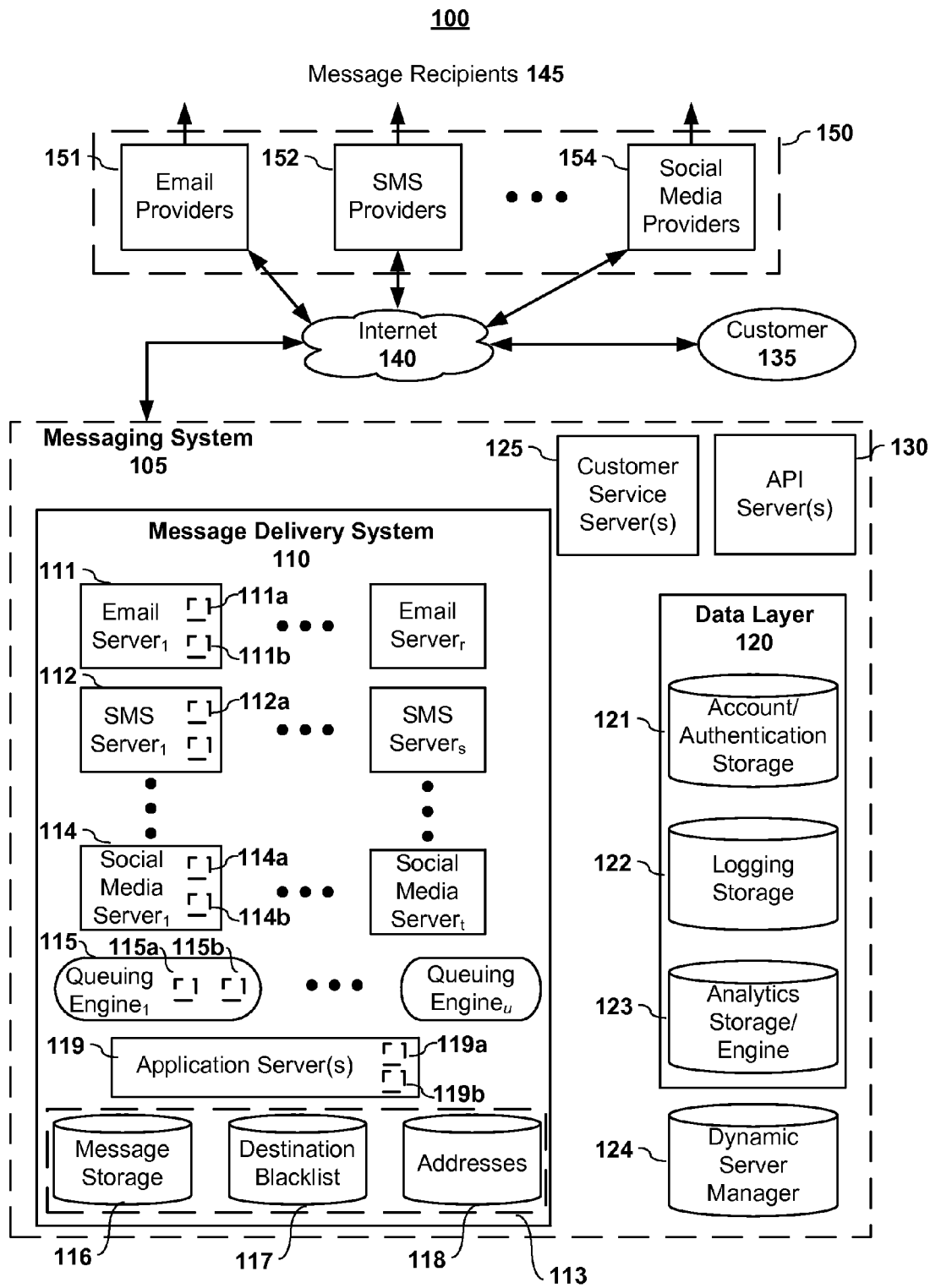
FIG. 1 depicts a functional block diagram of a scalable messaging system according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. Usage of the term "service," "function," "method," or "process" is not limited to describing a single function; usage of the term also may refer to a grouping of related functions or functionality. Similarly, a resource, which may be any computing resource appropriate for the context, is not limited to describing a single resource; the term also may be used to refer to a set of resources that may either be distributed or aggregated within a computing environment.

At least some of the embodiments of the present invention presented herein will be described using specific examples. These examples are provided by way of illustration and not by way of limitation. One skilled in the art shall also recognize the general applicability of the present inventions to other applications.

A. General System Overview

Due to the issues of prior messaging systems and methods, what is needed are systems and methods by which messaging can be performed with rapidly scalable resources. By rapidly changing the resources available to process messages, a messaging provider can avoid the costs of having unused capacity and also avoid becoming overwhelmed when traffic increases by quickly enlisting more resources as needed. Furthermore, it is beneficial for a messaging system to be able to handle a plurality of messaging types, channels, formats, or protocols. It shall be understood that the terms messaging types, channels, formats, or protocols may be used interchangeably. However, the complexities of dealing with different technologies and communication mechanisms have traditionally posed significant barriers. As explained in more detail below, these barriers are largely mitigated by abstracting aspects of the messaging processes. Furthermore, it is beneficial for a messaging system provider to have the ability to provide central management for messaging campaigns. Because the messaging system provider can provide central management, it can insure that regulatory compliance requirements (e.g., CAN-SPAM, HIPPA, Sarbanes-Oxley, etc.) have been met as well as providing central reporting, maintenance of data, and proving which messages were and were not sent (i.e., non-repudiation). Thus, the messaging campaign initiator can turn over messaging functions that are logically best suited for the messaging provider to perform.

FIG. 1 graphically depicts a messaging system according to embodiments of the present invention. Illustrated in FIG. 1 is a messaging system 105 for delivering messages of one or more message format types (e.g., email, SMS, voicemail, facsimile, social media, etc.) from a message campaign initiator (e.g., customer 135) to one or more groups of message recipients 145. It shall be noted that references to recipients 145 does not mean the same set of recipients in each case. Rather, recipients 145 are representative of groups of recipients that may or may not overlap (e.g., a recipient may be an email recipient and may also be a social media recipient). It shall also be noted that customer 135 is representative of numerous customers that may utilize one or more services provided by messaging system 105.

1. Messaging Providers

The message recipients 145 represent end users/end recipients, who are the recipients of any of a number of types of electronic communications from one or more of several electronic communication providers, including, by way of example, email providers 151, SMS providers 152, and social media providers 154. These providers represent the providers used by the message recipients to receive electronic messages. For example, a message recipient may receive her email messages via an email provider such as Yahoo! Mail provided by Yahoo! of Sunnyvale, Calif., her SMS provider may be her mobile phone carrier, and her social media provider may be a service provided by Twitter of San Francisco, Calif., or Facebook of Palo Alto, Calif. It shall be noted that the providers (e.g., items 151, 152, . . . , and 154) are representative types of electronic communication providers and that other providers and messaging types may be used. It shall also be noted that a provider may provide one or more messaging types or may aggregate one or more messaging types, which shall also be considered as being a provider for the purposes of this document.

As illustrated in FIG. 1, in embodiments, each of the messaging providers (e.g., items 151, 152, . . . , and 154) is connected to or can access at least one network, such as the Internet 140, although other networks, included public and private networks may be employed. In embodiments, the network 140 provides a conduit via which various protocols and communications may be used to deliver electronic messages to the end recipients 145 via one or more of the electronic communication providers (e.g., providers 151, 152, . . . , 154).

2. Messaging System

FIG. 1 depicts a functional block diagram of a messaging system 105 according to embodiments of the present invention. One skilled in the art shall understand that the other representations and grouping of the messaging system 105 may be employed yet achieve the same or similar results; accordingly, the present invention is not limited to the current depiction. In embodiments, the messaging system 105 comprises one or more customer service servers 125, one or more application programming interface (API) servers 130, a message delivery system 110, a data layer system 120, and one or more dynamic server managers 124.

The network 140 may be the Internet or one or more intranets, extranets, direct connections, or some combination thereof. In embodiments, the messaging system 105 may be part of the network 140. In embodiments, the system 105 may be one or more servers, such as web servers and one or more databases. System 105 may be contained within a single device or may be distributed across a plurality of devices, including but not limited to being located in one or more cloud locations, datacenters, or facilities. A cloud location, datacenter, or facility shall be understood to mean any place where one or more computer resources are located and at least one of the computer resources is connected to one or more networks.

a) Customer Service Server and API Server

In embodiments, the customer service server 125 provides a publicly-accessible user interface that allows customers (e.g., customer 135) of the messaging system 105 to submit information, such as information for a messaging campaign, to the messaging system 105 and to receive information, such as messaging campaign statistics, from the messaging system 105. In embodiments, the interface may be a website, a mobile device application, and the like.

Alternatively, or in addition to customer service server(s) 125, messaging system 105 includes one or more Application Programming Interface (or API) servers 130. In embodiments, the API servers 130 provide the same or similar services as provided by the customer service server 125. The API server 130 allows one or more computer systems of a customer to interface with the messaging system 105. This inter-computer communication allows the customer more freedom in developing systems and applications associated with the messaging system. For example, a customer may develop or use a custom interface (such as its own customer interface or a third-party interface) rather than use the interface provided via the customer service server 125. Also, a customer's system may retrieve data from the message system 105, such as messaging campaign data, and use this data to generate its own reports or statistics.

Whether using a customer service server 125, API server 130, or both, a customer transacts with the messaging system 105. In embodiments, these transactions relate to, but are not limited to, set-up and command of electronic messaging plans or campaigns and gathering data about one or more messaging campaigns. In embodiments a messaging plan or campaign information may include one or more of the following information: a list of address objects (recipient address information), information about who the message should appear as being from, information about who a recipient should respond to (if desired), and a generic or template message. In embodiments, the customer may also provide other data and/or metadata. An example of the other data or metadata that may be supplied is recipient-specific information (such as names) that will be merged into an appropriate variable field in a template message so as to personalize the message for the recipients. As part of a messaging campaign or campaigns, a customer may provide preference information, such as start/stop times for the campaign, preferred times when the messages should be sent (e.g., mornings, afternoons, etc.), formatting preferences, customization preference (e.g., logos, graphics, etc.), and analytics preference (e.g., what messages were sent, who received the messages, who did not, how long did a recipient review a message, error information, unusable addressees, etc.). In embodiments, messaging system 105 may offer different levels of service for customers, and a customer may select its level of service.

b) Messaging Deliver System

In embodiments, message delivery system 110 prepares and delivers messages as part of message campaigns and helps compile data about message campaigns. The message delivery system 110 comprises one or more message servers (e.g., servers 111, 112, . . . , 114), one or more queuing engines 115, one or more application servers 119, and message-related data stores 113 (e.g., items 116, 117, and 118). In embodiments, the message servers receive message components from the queuing engine, properly arrange the components, and send the messages. In embodiments, the queuing engines 115, and/or application server 119 merge data from the data storage systems or layer to form "queuing engine messages" that comprise the message components for the message servers.

It shall be understood that term "queue" as used herein (including in other phrases such as by way of example "queuing engine" "queuing engine message") shall be understood to include list queues as well as direct channels for sending data and/or command and control instructions. In embodiments, a queue shall be understood to include a connection comprising one or more electronic communications and one or more messages or pieces of data arranged to await transmission over the one or more electronic communications to one or more computers and/or software components.

(i) Message Data Storage Systems

In embodiments, the message data storage system 113 may include message storage 116, destination blacklist 117, and addresses data store 118. In embodiments, the message storage 116 stores message templates. A message template may be a voicemail message, email message, SMS message, Facebook message, Twitter post, facsimiles, and the like. In embodiments, the message template may include one or more fields to be merged or filled in with data, such as recipient addresses, return addresses, and/or account information from the account storage 121. For example, the template may include fields for the recipients' names to allow the message to be personalized for the recipient. In embodiments, the message templates may include fields for other data, such as multimedia data (e.g., images, sound files, etc.), text, links, lists, personalized content, and so forth.

In embodiments, the addresses data store 118 comprises one or more listings of contact information for contacting recipients. In embodiments, the contact information may support one or more digital messaging address standards, such as by way of example and not limitation, email, SMS, Twitter, Facebook, phone number, mobile application or communication, and the like. Thus, the term "address" shall be understood to encompass any means for addressing an entity for purposes of delivering a message. In embodiments, the addresses data store 118 may comprise additional information, such as, by way of example and not limitation, recipient-related information or other information.

In embodiments, the messaging system 105 also includes a destination blacklist data storage 117. In embodiments, a blacklist is a list of arbitrary address types that support a plurality of digital messaging address standards, such as by way of example and not limitation, email, SMS, Twitter, Facebook, phone number, mobile application or communication, and the like. In embodiments, the blacklist is used in the message delivery system to ensure that no messages are delivered to this address object. One of ordinary skill in the art shall recognize that information related to what was and was not delivered may be logged for later use and that this data may be combined with one or more customer accounts and/or specific messaging campaigns to decide whether this address is unusable for all accounts and campaigns or some fraction thereof. In embodiments, the blacklist stores contacts, such as at least one or more pieces of identifying information such as name, message address information, and the like, which contacts are known to be invalid or have been designated as not to receive messages. In embodiments, the destination blacklist includes all the blacklist contacts regardless of list, message type, or customer. In embodiments, blacklists may be grouped, queried, arranged, accessed, used, stored, and/or sorted by one or more factors, such as message type, customer, date, recipient, address, etc.

One skilled in the art shall recognize that the elimination of blacklist recipients from a set of addresses for a messaging campaign may occur at one or more points along the process flow. For example, when a new message campaign is initially received from a customer or after it has been stored into data storage, the addresses may be checked against the blacklist 117 to remove or quarantine matching contacts. Alternatively, or in addition, when the compiling of data occurs, any messages destined for or merged with known blacklisted contacts may be deleted and may also be logged in the logging storage 122. The logged lists may later be reviewed, such as by administrators, by the customer of the message campaign, or both. It shall be noted that by removing the blacklist contacts, the messaging system burden is reduced, which increases performance and delivery rates. Similarly, in embodiments, messaging system 105 tracks addresses that do not work and/or recipients who do not want to be contacted. This information may be stored in logging storage 122, in the destination blacklist 117, or both.

In embodiments, the logged data may be analyzed, using heuristics, manual observations, pattern recognition, by other means, or a combination thereof, to infer address objects that should be in the blacklist Also, in embodiments, return messages and other pattern information may be used by the system in messaging campaigns. It shall be noted that the analysis of the logged data can include more than just failed messages or "do-not-send" messages. In embodiments, non-numeric messages or patterns may be noted. For example, a message provider may have quotas, size limits, speed limitations, and the like, which may be noted from messages or performance patterns. Thus, if it is noticed, for example, that if more than x messages are sent to a particular provider in y amount of time, the provider gets overwhelmed. By recognizing this pattern, messaging system 105 can send at a slower rate to that message provider.

One skilled in the art shall recognize that having messaging system 105 track undeliverable addresses or do-not-contact addresses is extremely beneficial for a number of reasons. Not only does it help increase the performance of the system, but it helps reduce the burden on the customer and improves compliance. As noted previously, prior mass message distributors simply broadcasted a message to a list of addresses it was given. These distributors relied upon the message campaign initiator to provide it with a valid set of addresses. The burden of having a list of valid addresses (e.g., correctly formatted and non-blacklist addresses) rested with the message campaign initiator. To make compliance and tracking even more difficult, the notices of undeliverable messages or do-not-contact messages were typically sent to the campaign initiator, not the mass message distributor. However, these messages may not be conveyed to the message campaign initiator. Regardless, it is typically incumbent upon the campaign initiator to track and record the addressee information.

Unlike these prior approaches that separated message delivery and blacklist address tracking (to the extent any such tracking was performed), the messaging system 105 integrates tracking and removing of blacklist contacts with the process of message delivery. Thus, in embodiments, the messaging system 105 receives the notices and information about undeliverable messages and do-not-contact individuals, stores this data, and uses the information to removed contacts from future message campaigns. Thus, in embodiments, the blacklist data 117 can be used as a check against addresses supplied by a customer. This configuration not only improves the message delivery process by not sending needless or unwanted messages but also improves compliance. As messaging become more regulated, for example the CAN-SPAM Act, being able to monitor and track compliance with do-not-contact individuals is not only an issue about message delivery performance but is also a legal one.

In embodiments, the campaign initiator may access the blacklist data via the interface 125 or API server 130. For example, a campaign initiator may view or download a list or lists of blacklist contacts. In embodiments, the blacklist data may be sorted or accessed by any of a number of parameters, such as do-not-contact addresses, undeliverable addresses, date added to the list, contact type, message campaign(s), etc. In embodiments, a customer may only access the blacklist data and address information associated with its message campaigns.

(ii) Queuing Engine and Application Server

In the message delivery system 110, messaging data is not directly pushed from the data stores (e.g., items 116 and 118) to the message servers (e.g., items 111, 112, . . . , 114) but is fed to a universal queuing layer. Typically, a tight link exists between the message server and the data storage, and this tight link inhibits scalability. By having a distributed but generic queuing layer, the messaging system 105 can handle high volumes of messages regardless of message type.

In embodiments, one or more application servers 119 and one or more queuing engines 115 cooperate to provide data to the various message servers (e.g., email servers 111, SMS servers 112, and social media servers 114) from the data storages by merging valid consumer addresses from the address database 118 with template messages from message storage 116, while removing unusable addresses found in the destination blacklist 117. Thus, instead of having a message server (e.g., email server, SMS server, etc.) pull data directly from a data store, which can be slow, data is pre-processed and queued by queuing engines. Because the application servers and queuing engines provide an intermediary storage and distribution layer between the data store layer and the message servers, the message servers can run asynchronously from the data storage, thereby improving efficiency and scalability. Thus, by using a queuing layer, the data stores can operate at their maximum rate and the message servers can receive data when they are ready without having to wait or alternatively without being overwhelmed.

In embodiments, a set of message data, which may be referred to herein as a queuing engine (QE) message is compiled from the data storage. In embodiments, a queuing engine (QE) message may comprise a plurality of data components. The plurality of data components may include: (1) message type (e.g., email, SMS, etc.); (2) message template or body of message (which may be a static message or a message template with one or more variables); (3) sender or "from:" information; (4) a set of addresses or "to:" information; and (5) additional data, such as tags or metadata, for personalizing the message template, and so forth. One skilled in the art shall recognize that additional or few data sets may be included in a queuing engine message. It shall be noted that, in embodiments, the queuing engine message can represent a number of message type (e.g., email, SMS, etc.) by having an identifier that indicates the final message type.

Thus, the queuing engine message is agnostic to message type, which further facilities flexibility in processing and scaling at the queuing abstraction layer.

It shall also be noted that a "set of addresses" may be any number of addresses. In embodiments, the number of addresses for a QE message may be user-selected. Although there may be one QE message for every one message sent to a recipient, in embodiments, a QE message may be configured to have a one-to-many relationship with the outgoing messages. For example, in embodiments, given a messaging campaign that has 10,000 addressees so that 10,000 messages need to be sent, a QE message may be configured to have a block of 1000 addresses. Therefore, the message campaign results in 10 QE messages being formed and placed into the queue. Such a configuration has several advantages, which will be apparent to one skilled in the art. For example, if a QE message were created for each recipient message, a great deal of duplicated data would be transmitted within the messaging system (e.g., having to replicate the message body data and sender information for each message). By generating QE messages with blocks of addresses, the number of times common information needs to be transmitted is dramatically reduced, thereby creating a form of data compression. Also, by breaking very large messaging campaigns into smaller groups, the load can be better balanced across message servers, and if need be, more queuing engines and/or more message servers may be created to service the load. In addition, by having manageable QE message blocks of addresses, if there is some failure with a QE message, re-generating the QE message and/or re-queuing it is not overly burdensome.

It shall be noted that this architecture also aids in controlling bandwidth, which can be important when implementing a messaging system in a cloud computing environment. Cloud computing operates on the principle of having a large set of resources and dividing usage of those resources amongst a bunch of users. Although the set of resources is large and the hope is that not all users will access the resources at the same time, the resources are finite and there are times of heavy concurrent use. Thus, in a cloud computing environment, there is unknown bandwidth between virtual servers in the cloud, and at times, the operations can be slow. Thus, embodiments of the present invention mitigate this issue by, at least in part, having the message servers generating messages from the QE messages.

In embodiments, by forming abstract QE messages, the queuing engine need not concern itself with the specific message type. This way, the queuing engine layer can treat all QE messages the same. Although, in embodiments, one or more QE message tags or attributes may be used to create a quality of service level for different message types, recipients, messages, or customers. In embodiments, the queuing engine makes no determination about which data is in the queue or its particular formatting for the message type. Rather, in embodiments, generating properly formatted messages of a message type (e.g., email, SMS, etc.) is the province of the message servers. The QE message transmits the needed data to the message servers, and a message server takes the pieces of data from a QE message, properly orients the data into messages, and manages the sending of the properly formed messages.

In embodiments, the application servers is configured to decide what messages are to be generated and when. In embodiments, the application server includes a rules engine to make definitions regarding the processing of messages (e.g., the what, where, how, when). In embodiments, the application server generates queuing engine messages by pulling from the data stores and placing the queuing engine messages into the queuing engine or engines. As part of generating the queuing engine messages, the application server may also perform message validation. For example, the application server may check that message addresses or message data are consistent with the message type. The queuing engines hold these queuing engine messages to be pulled by various outbound protocol servers (SMTP, SMS, etc). In embodiments, the queue engine ensures that it does not delete messages until the outbound protocol server (i.e., message server) has confirmed that it has completed processing the queuing engine messages that it pulled. Thus, if there was a failure, the queuing engine has the messages available for retry. Furthermore, in embodiments, a queuing engine may include security regarding which machines can pull what types of content. In embodiments, a queuing engine supports queries to it (for example: how deep is the queue for message type X?; is the queue getting longer or short?; what is the average time on this queue?; etc.). One skilled in the art shall recognize that the application server, queuing engine, or both may support additional features and functionality.

In embodiments, the application server(s), queuing engine(s), or both may perform additional pre-processing for the message servers. For example, in embodiments, the application server(s), queuing engine(s), or both may generate QE messages wherein at least some of the message-type specific formatting has been done.

(iii) Message Servers

As illustrated in FIG. 1, embodiments of message delivery system 110 comprise message servers of various message types. For example, FIG. 1 depicts email server(s) 111, SMS server(s) 112, and social media server(s) 115. As previously noted, the depicted servers are just some types of message servers that may be employed and that other message servers for other message types may also be included. In embodiments, message delivery system 110 includes or can access a server for each electronic message type.

It shall be noted that message delivery system 110 may include a dynamic number of each type of message server. For example, message delivery system 110 may include a fluctuating number of email servers depending upon the number of email messages awaiting delivery. The process of adding and subtracting message servers is described in more detail below with respect to the dynamic server manager 124.

The message servers are communicatively coupled to the queuing engine layer and pull from one or more queuing engines QE messages associated with the message type that the server supports. For example, in embodiments, a message server that supports message type X will request the queuing engine layer to send it the next n number of QE messages of type X. In embodiments, the message server receives the QE messages and uses the data in the QE messages to generate properly formatted messages for the recipients and delivers them via one or more networks and service providers to the recipients 145.

In embodiments, the email message servers pull messages of type "email" from the queuing engines 115 and deliver these messages via the Internet 140 and email providers 151 to intended recipients 145. In embodiments, these servers ensure that messages conform to Internet standards and generally accepted formats (such as, by way of example, Request for Comment 822 and several other RFCs listed by the Internet Engineering Task Force related to SMTP/ESMTP).

In embodiments, the SMS servers 112 pull SMS-type messages from the queuing engines 115 and deliver them via the Internet 140 and the SMS providers 112 to the intended recipients 145. These servers ensure that messages conform to Internet standards and generally accepted formats for SMS messages.

In embodiments, the social media servers 114 pull social-media-type messages from the queuing engines 115 and deliver them via the Internet 140 and social media providers 154, such as services like Twitter and Facebook to intended recipients 145. These servers ensure that messages conform to Internet and corporate standards and generally accepted formats for each provider of social media services messages One skilled in the art shall recognize that an additional benefit of at least some of the embodiments of the current architecture is that the message servers can compile the messages in memory, which is much faster than generating the message by reading data from the data stores.

c) Data Layer

Returning to FIG. 1, in embodiments, the messaging system 105 also includes data layer components 120. In embodiments, the data layer 120 comprises account/authentication storage 121, logging storage 122, and analytics storage 123.

In embodiments, account/authentication storage 121 stores information related to customer/user accounts. For example, account/authentication storage 121 stores authentication tokens, user/account profile data, recent activities, etc. In embodiments, account/authentication storage 121 stores data related to accounting/billing for message delivery services performed by the messaging system 105. In embodiments, some or all of the data may be encrypted or obfuscated and may require one or more methods of authentication to access or function. It shall be noted that one or more other data storage elements may be part of the data layer, such as components message storage 116, destination blacklist 117, and addresses 118. However, in the depicted embodiment, the customer account data is functional and/or physically separated from the other data for security reasons. Thus, a nefarious customer who signs into the system is less likely to access other data, such as client recipient addresses. In embodiments, the address data may also be encrypted or obfuscated at one or more points in the message processing.

In embodiments, the logging storage 122 contains data related to system operations. For example, the logging storage 122 may contain one or more of the results of message campaigns, performance data, returned or undeliverable notices, and so forth. This information may be used by the messaging system, the customer, or both for later analytics and decision making.

In embodiments, the messaging system 105 includes an analytics storage/analytics engine 123 to analyze data. In embodiments, the analytics storage/analytics engine 123 is communicatively coupled to receive or access raw data stored in the logging storage 122 and uses that data for analytics and aid decision making. Analytics storage/analytics engine 123 provides the ability to visually track message campaigns, apply statistical models, and/or view raw resultant data about any operation of the entire system 105. Thus, a systems administrator or customer can monitor such items as: what happened in a message campaign or in a part of a message campaign, who did and who did not receive messages, how long it took to process the message campaign, how long user interacted with the messages, how many and who responded, and so forth. In embodiments, a customer may access the analytics engine to generate and view data reports and statistics. Alternatively, or in additional, a customer may retrieve data or reports via the API server and customize the information as they choose.

D) Dynamic Server Management (DSM)

Messaging system 105 also includes a dynamic server manager (DSM) 124 that monitors current and trending data to determine how many of what types of servers should be in existence to optimize the messaging operations. In embodiments, the DSM 124 automatically increases and reduces the number of message servers (e.g., servers 111, 112, . . . , 114) and the number of queuing engines 115 based upon message loads. In embodiments, the DSM may also perform load balancing between servers, such as, by way of example and not limitation, by dividing message traffic equally among all appropriate servers and engines. If the load at a server exceeds a threshold criterion or criteria, the DSM can load balance or cause one or more servers of the appropriate type to be created. For example, the DSM knows the level that will create a queue overflow. If the load on a queuing engine exceeds a threshold level related to the queue overflow and the load over time appears to be increasing, the DSM may initiate another queuing engine. Or, for example, the DSM may monitor the loads at a message server (e.g., an email server) and monitor the number of QE messages in the queuing engines that have that same message type. Based upon this information, the DSM may change (either up or down) the number of that type of message server. One skilled in the art shall recognize a number of different threshold, triggers, metrics, and conditions may be employed by the DSM to load balance and to determine when the conditions merit creating a new server or terminating an existing server.

In embodiments, all engines and servers register with the DSM 124. For example, all queuing engines register themselves with the DSM so that other system components, such as the message servers, know where they are. In embodiments, the DSM may list or publish where all the servers are in the messaging system to facilitate message delivery. For example, a message server may request at regular intervals (e.g., once every 60 seconds) an address listing of all currently active queuing engines. Thus, as queuing engines are created and decommissioned, the message servers have a continually updating list of the queuing engines, and any message server can pull QE messages from any active queuing engine. This information is important when dealing with a distributed or cloud implemented system because the messaging servers and queuing engines may be located anywhere with multiple clouds, within portions of a cloud, etc.

It shall be noted that, in embodiments, the messaging system 105 may pre-configure or "pre-warm" one or more resources. For example, the messaging system may bring on-line a message server and have it send test messages or other messages to get recipient service providers to see and begin trusting that new server. Consider the following example provided by way of illustration and not limitation. If an email server is suddenly brought on-line and begins sending a large volume of email, service providers may suspect that it is a spam server and block or otherwise limit the amount of messages it receives or processes from that resource. Sometimes, the process of becoming "trusted" as a resource by third-party service providers can take hours, days, and even weeks. This delay is unacceptable, particularly for systems that require rapid scaling. Thus, a number of resources may be brought on-line and begin sending test messages or other messages in a process to get that new resource trusted by the providers. In embodiments, the resource may have a static IP address that the providers initially recognize as new but, after the "pre-warm" process, that resource becomes accepted as trusted. Therefore, when demand requires a new message server to handle increased work flow, the resource brought on-line already has a trusted identification associated with it.

B. Exemplary Method Embodiments

Provided below are exemplary embodiments of methods related to message handling. The exemplary embodiments include implementation information, which is provided by way of example and not limitation. For example, it shall be noted that some of the steps in the depicted methods may be altered or performed in different order without materially altering the outcome. Accordingly, it shall be noted that implementation details are a matter of choice and that other implementations may be used. Thus, implementation details that are a matter of choice or that do not materially alter application of message handling shall not limit the scope of the present invention.

Figure 2:
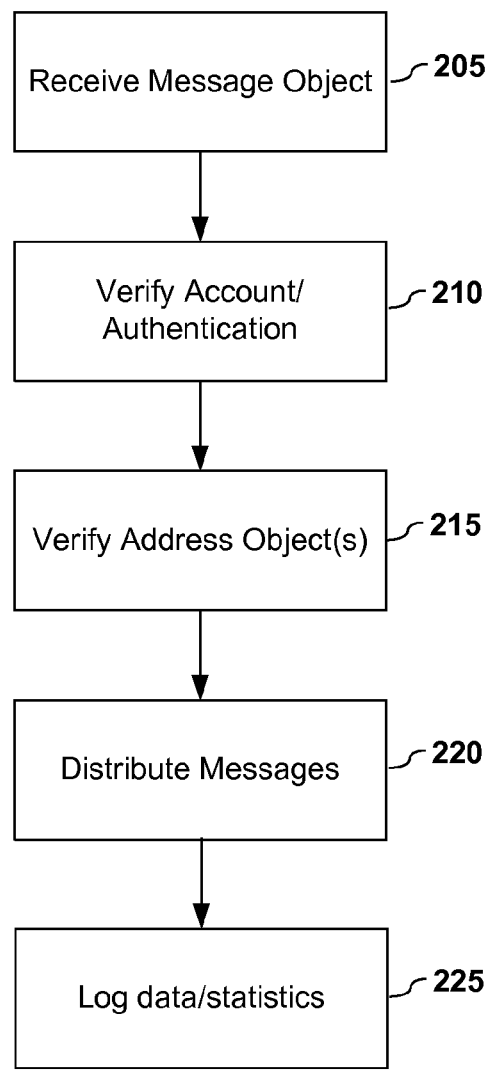
FIG. 2 depicts an embodiment of a method for processing a messaging campaign according to embodiments of the present invention.

FIG. 2 depicts an embodiment of a method for performing a messaging campaign according to embodiments of the present invention. In embodiments, a customer (e.g., customer 135 in FIG. 1) submits (205) a properly formed set of information called a message object for the purpose of that information being processed to generate message outputs.

Figure 3:
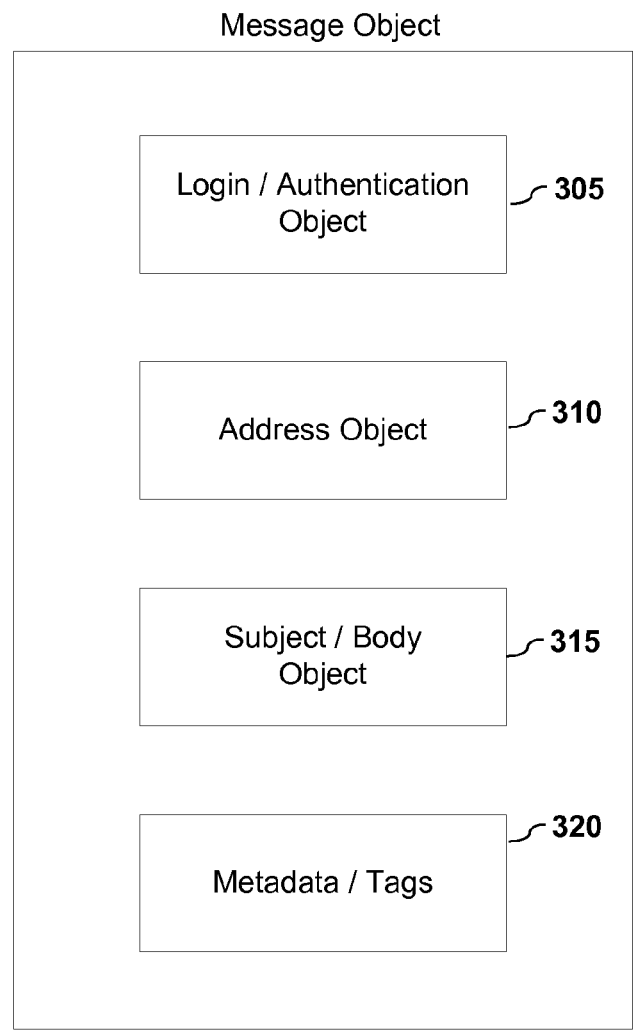
FIG. 3 depicts a message object according to embodiments of the present invention.

FIG. 3 depicts a message object according to embodiments of the present invention. In embodiments, a message object 300 comprises a login or authentication object 305, which contains information for authenticating the customer submitting the message object. In embodiment, data associated with the login or authentication object 305 is compared (210) against data in the authentication storage 121. For properly authenticated customers, the message object, or a portion thereof, is accepted and stored in the message storage 116 and is tagged as belonging to a given account. In embodiment, the account and authentication process includes (210) allowing for the rejection of the message object 300, or portions thereof, into the message storage 116 if the destination blacklist 117 identifies one or more address objects as invalid or unrecognized. Alternatively, a user may go through a separate login process and the authentication object may not be present in the message object.

As shown in FIG. 3, the message object 300 may also include one or more address objects 310. In embodiments, the address object 310 identifies where the customer appears to be coming from (i.e., an address to which a recipient may reply or simply just identify a sender) and recipient addresses for delivering the message or messages. These objects are of arbitrary type and support a number of communication types, such as, for example, email, phone, SMS, and social media addressing types. In embodiment, a check against the destination blacklist allows (215) for the rejection of the message object 300, or portions thereof, into the message storage 116 or address storage 118 if the destination blacklist 117 identifies one or more address objects as invalid or unrecognized.

As shown in FIG. 3, the message object 300 may also include one or more subject/body objects 315. In embodiments, the subject/body object 315 contains text, graphics and/or other data related to the set of to-be-delivered messages (or message campaign), including the actual message data to be delivered to recipients 145. In embodiments, the subject/body object 315 may include a static message template and/or a message template with one or more variables. For example, as discussed previously, additional data may also be included to personalize the message. In embodiments, data is merged with the message template, such as data in metadata/tags object 320, to replace variable names in the subject/body object 315. In embodiments, this metadata format provides flexibility and allows the customer to define the variables and variable field names. For example, the message body may include a field called "% first_name %." When the message is generated, "first_name" in the metadata is merged with the message template to produce the message for the recipient.

Finally, messages that are determined to have come from a valid and authenticated account and have been merged with the merge transformation process are sent (220) to the intended recipients. In embodiments, outbound message data and statistics are logged (225) in the logging storage 122 and/or analytics storage/engine 123.

Figure 4:
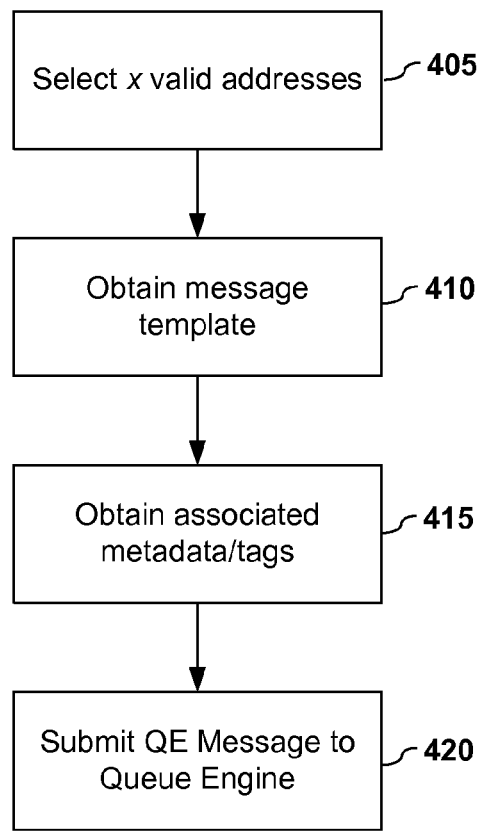
FIG. 4 depicts a method of generating a queuing engine (QE) message from a message object stored in one or more data stores according to embodiments of the present invention.

FIG. 4 depicts a method of generating a queuing engine (QE) message from a message object stored in message storage 116 and addresses storage 118 according to embodiments of the present invention. In embodiments, the application server 119 generates a QE message by selecting from a message object the components a message server will need to produce the recipient messages. Thus, the application server will select (405) a number of valid addresses from the address object(s) of the message object. For each message object or message campaign, the DSM tracks which address objects have been processed in QE messages and which yet remain to be processed and may track additional information such as, what messages were sent, to whom, when, and it took. This information may be stored in one or more databases in data layer 120. In embodiments, the application server also obtains (410) the message template and obtains (415) the associated metadata/tags, if any. As noted above, the associated metadata/tags may include data for personalizing the message or other information. In embodiments, the associated metadata includes an identifier for identifying the message type (e.g., email, SMS, fax, voicemail, etc.). Once all the data has been acquired from the data storage, the QE message is submitted to a queue engine.

In embodiments, the interactions and message coordination may be facilitated by having data queues and command and control processes queues for certain of the system components. Returning to FIG. 1, in embodiments, the servers (which includes the engines) have a data queue component or processes (e.g., 111a, 112a, 114a, 115a, and 119a) and a command and control queues component or processes (e.g., 111b, 112b, 114b, 115b, and 119b). These two components are two kinds of queues/processes that are carried by the system components.

In embodiments, data queue processes take messages from QE data queue 115a and to perform message processing (e.g., reassembly, validation, blacklist checking, etc.). Because the queue may be distributed, in embodiments, data queue components act as requesting agents that request more messages to be produced based on current load/demand. As mentioned previously, in embodiments, the dynamic server manager enumerates all resources by type, thereby facilitating the requesting agent finding all of the queuing engines that are available. Similarly, the dynamic server manager knows when a resource is unavailable, thereby allowing the overall system process to continue with a different resource. For example, a requesting agent may start communications with a given queuing engine, that engine goes offline, and the rest of the message delivery can continue with a different queuing engine. In embodiments, the requesting agents discover what resources are available and statistically load balance across all alive resources.

In embodiments, the command and control queues are similar in implementation as the data queues (e.g., 115a) that carry existing messages but serve different functions. In embodiments, data processes/queues perform data processes and command and control processes/queues change execution of that data. In embodiments, the command and control processes are processes running on the servers that listen for messages that change the processing of messages from the QE. Data queues can become very busy delivering millions of messages. If compelled by clients or legal authorities to stop transmission and delete the remaining items in the queues in a timely fashion (e.g., within one minute), a method should be provided which will not be superseded or delayed by the transmission of large quantities of messages. In embodiments, by having command and control queues with dedicated processes in the message servers (e.g., 111*b*, 112*b*, and 114*b*) as well as in the application servers 119*b*, these dedicated processes can watch for various commands including, at least, start, stop, and delete commands. In embodiments, the command and control queues may support many others commands or processes such as, by of example and not limitation, status, count sent, time last sent, time first sent, and resume processing. When commands such as stop or delete are received by the command and control processes, all messages that are yet to be received and processed by the message servers and/or those not sent out of the message delivery system 110 cease being processed and or are deliberately deleted within a very short time window (e.g., one minute).

In embodiments, the command and control processes provide a mechanism by which the messaging system is able to start up an arbitrary quantity of any given resource to scale to meet demand. In embodiments, the decisions to perform scaling may be manual and done via an interface, such as command line or GUI; in addition or alternatively, the scaling may be performed automatically based on the then-current demand. It shall be understood that scaling includes shutting down resources that are no longer necessary. It shall also be understood that shutting down a resource may include transferring some or all of its existing load to another resource(s) or allowing the resource to complete it current load but not receive any additional workload. Similarly, in embodiments, the scalable messaging system may restart a given resource—that resource is able to finish its work, or alternatively, a differential retry mechanism may republish all of the messages that were pending at the offline resource.

In embodiments, the DSM makes a QE 115 and an application server 119 available and the application server 119 is configured to read and write messages onto a given set of data and command and control queues, which may be read by all configured message servers. For example, an SMS message server listens for message data via its data queue 112*a* and listens for command and control data via its command and control queue 112*b*.

It shall be noted that in embodiments, a customer database, such as account storage 121, may include information to associate customers with certain queues, servers, or services. For example, in embodiments, a QUEUE_NAME is stored for one or more clients/customers. When a server is brought on-line or otherwise configured, it can instructed to look for QE messages on the queue that have a specific QUEUE_NAME (e.g., QUEUE_NAME=customerA, customerB). Thus, based on load and messages put onto the queue, the server will process messages of its message type and messages of the identified customer(s). In embodiments, the DSM will generate the server and the server will read from the customer record to determine what the QUEUE_NAME(s) are that it should be listening to as directed by the DSM. In embodiments, the configuration of QUEUE_NAMES may be done manually. In embodiments, a server may be configured to process messages for all customers (e.g., QUEUE_NAME=all_customers). One skilled in the art shall recognize that such configurations allow the messaging system direct resources to process using specific resources and also allows it to offer different levels of service for different clients/customers.

One skilled in the art shall recognize that, in embodiments, it is this account/server/queue name association that the application servers' data 119*a* and command and control processes 119*b* will read to decide what queues to write to on the QEs and what queues the message servers data (such as 111*a*, 112*a*, and 114*a*) and command and control processes (111*b*, 112*b*, and 114*b*) will decide to read from. Thus, the servers are configured such that they know what accounts they should service and what queue names represent those accounts.

Figure 5:
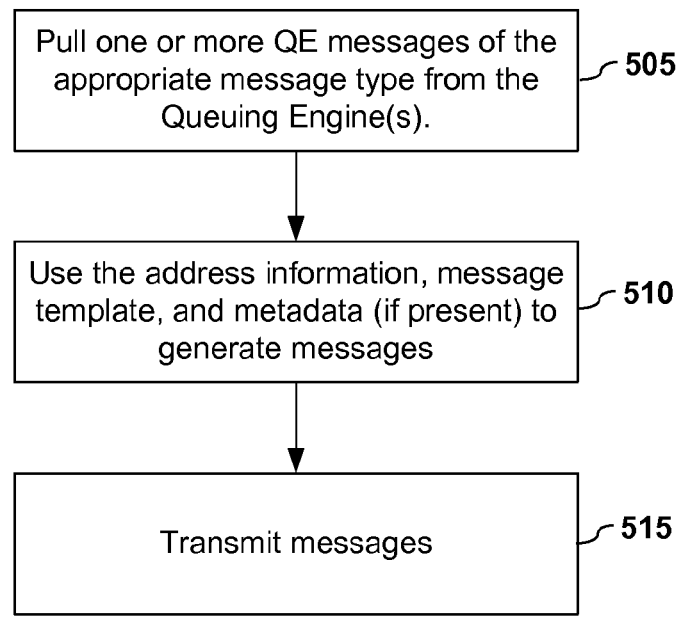
FIG. 5 depicts a method for generating a set of messages from a queuing engine (QE) message according to embodiments of the present invention.

FIG. 5 depicts a method for generating a set of messages from a queuing engine message according to embodiments of the present invention. As depicted in FIG. 5, once a message server has capacity to process more messages, it pulls (505) one or more QE messages tagged with the appropriate message type from the queuing engine(s) 115. As previously explained, the message server uses the information in the QE message (e.g., address information, message template, metadata (if present), etc.) to generate (510) properly formatted messages. These properly formatted messages are transmit (515) via one or more networks (e.g., network 140 and providers 151, 152, . . . , 154) to the recipients 145.

In embodiments, one or more of message campaigns, portions of message campaigns, QE messages, and recipient messages may be assigned one or more identifiers. For example, in embodiments, a message campaign may be assigned a unique ID and each message to be delivered may be assigned a unique ID. One benefit of assigning IDs is keeping track of every message. Thus, by knowing every message that was delivered and every message that was expected to be delivered, the system can make sure any missing messages are sent if there are differences. Differences between what is expected to be sent and what is actually sent can occur for a few reasons, such as message provider failure, failure of a message server, and failure of a queuing engine. Normally, in embodiments, if one or more message servers or one or more queuing engine fails, when the server or engine comes back on-line, the data in its buffer/queue waiting to be processed is processed. This is one benefit of the current architecture—because message campaigns are typically broken into manageable portions and distributed across a number of servers, the vast majority of the messages are still processed without incident even if one or more server (which shall be considered to include the QE) fails. Just the messages already with the server that failed are delayed while it comes back on-line. However, even if the data is corrupted or the server cannot be brought back on-line, no messages are lost, nor are they duplicated. Using the identifiers, the system can determine what was not successful processed and will insure that those messages are sent.

Figure 6:
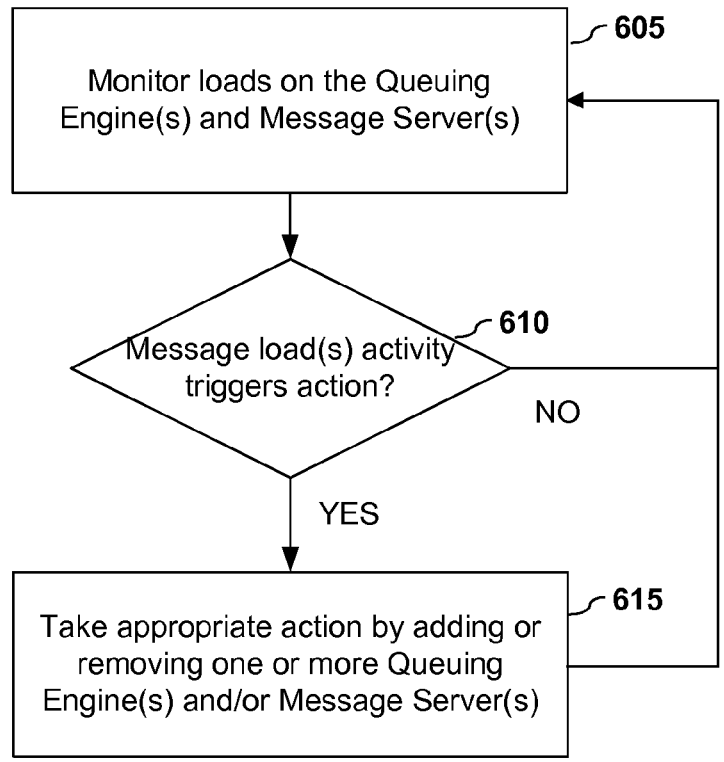
FIG. 6 depicts a method for maintaining an appropriate number of messaging servers and queuing engines according to embodiments of the present invention.

FIG. 6 depicts a method for maintaining an appropriate number of messaging servers and queuing engines according to embodiments of the present invention. In embodiments, the dynamic server manager (DSM) 124 monitors periodically or continually the loads on the queuing engine(s) and the message server(s). As previously mentioned, threshold and triggers may be defined for taking action regarding loads. Thus, if a change in the messaging activity triggers an action, the DSM takes the appropriate action by adding or removing one or more queuing engine(s) and/or message server(s) as indicated by the monitoring data. This way, the messaging system maintains the appropriate level of resources for quickly sending out the messages but does not incur unnecessary costs by having unused network resources.

It shall be noted that the messaging systems presented herein provide a number of advantages. The systems can deliver a number of different messages types of any size to any address from any address via a selectable geographic arrangement. Because embodiments presented herein contemplated implementation in a cloud computing environment, a number of computer resources may be employed. These resources may be geographically dispersed and may have different performance and price factors. Thus, the system may direct the message traffic to different resources depending on number of factors, including but not limited to, customer, addressees, price, performance, rate, size, reliability, and timeliness requirements. In embodiments, the DSM and/or analytic engine may monitor statistics for determining price, performance, reliability, rate, size, timeliness, etc., which help inform which cloud and datacenter is used to send messages.

Furthermore, the queuing engines allow for asynchronous communication between clouds and datacenters and other queuing engines inside those datacenters. Input from the queuing engines and other sources inform when there is excess capacity or too little capacity for the current number of servers. Thus, server and engine resources can be added or released based on the workload levels. In embodiments, these resources centrally registered with the system so that workload can be quickly balanced and properly maintained. This dynamic configuration provides significant cost and scalability advantages over prior approaches.

C. Multi-location/Multi-Datacenter Embodiments

Figure 7:
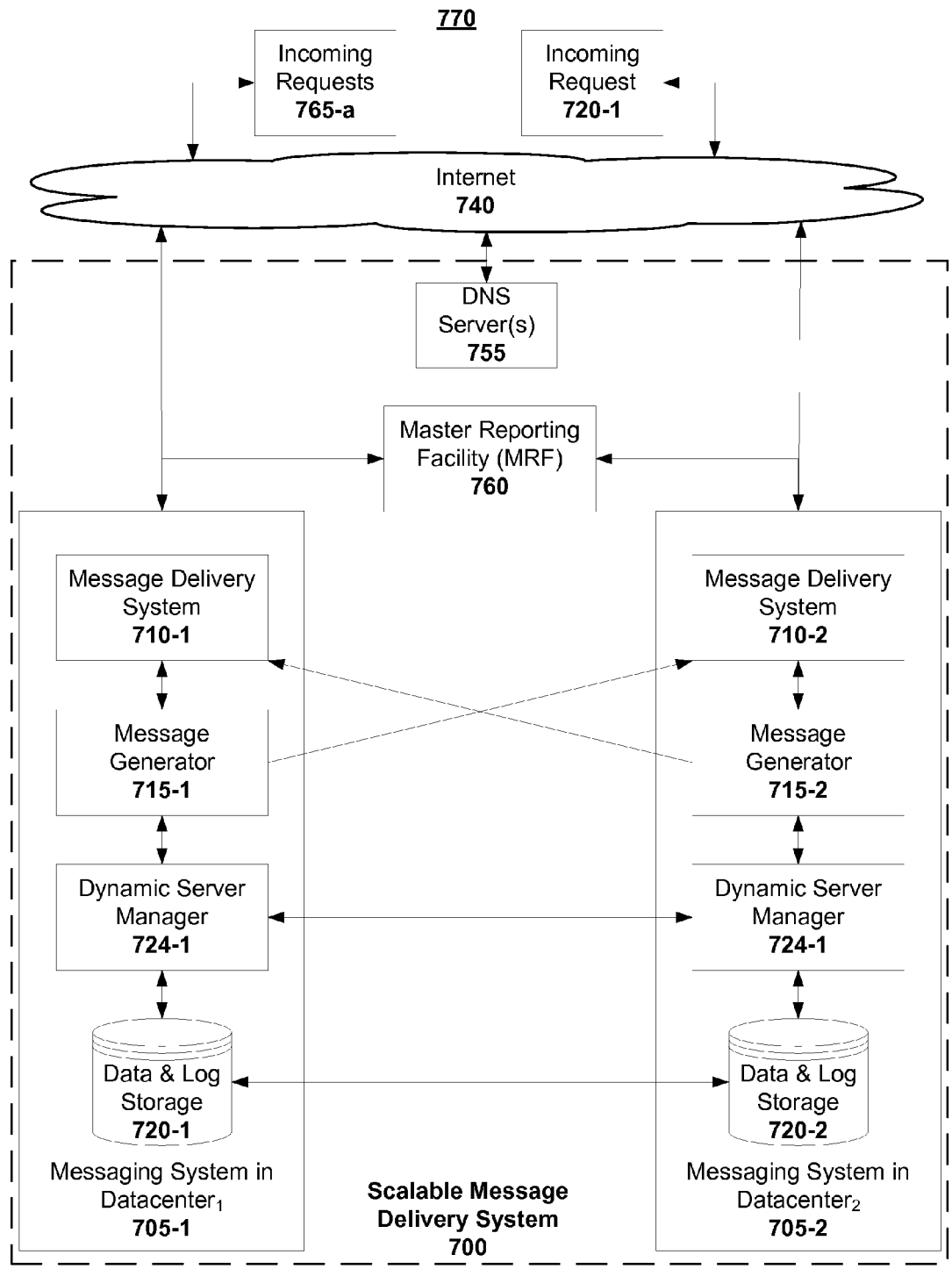
FIG. 7 depicts a functional block diagram of a scalable message system in multiple datacenter locations according to embodiments of the present invention.

As mentioned previously, embodiments of the scalable messaging system may be implemented in a distributed or cloud environment. FIG. 7 depicts a functional block diagram of a scalable message system 700 implemented across multiple datacenter locations according to embodiments of the present invention.

As shown in FIG. 7, the scalable message delivery system 700 includes one or more messaging system 705. In embodiments, the messaging systems may be the same or similar to the scalable messaging system 105 depicted in FIG. 1. In embodiments, a scalable messaging system 705 comprises a message delivery system 710, a message generator 715, a dynamic server manager 724, and data and log storage 720. In embodiments, message delivery system may comprise the message servers (e.g., 111, 112, . . . , 114) as shown in FIG. 1; a message generator 715 may comprise the message abstraction layer comprising queuing engine 115 and/or application server 119; and data and log storage 703 may comprise the logging storage 122 and analytics/storage engine 123. In embodiments, the data and log storage 703 may also comprise one or more data store resources (116, 117, and 118) from message data store 113 in FIG. 1. In embodiments, the scalable message delivery system also includes a domain name system (DNS) server 755 for the purpose of locating active messaging systems 705.

Figure 8:
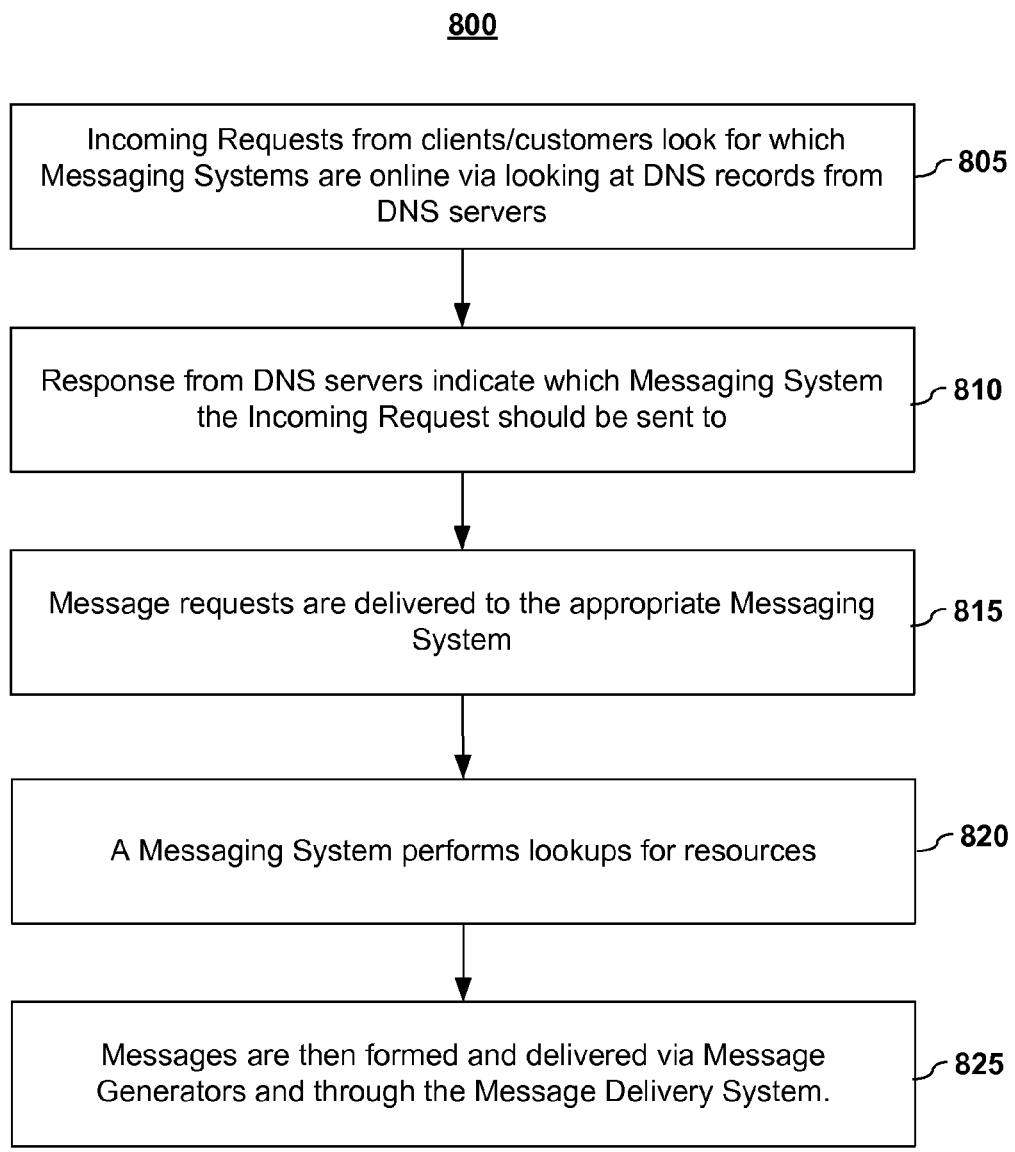
FIG. 8 depicts a method for receiving a messaging project request and processing the messaging project according to embodiments of the present invention.

FIG. 8 depicts a method for receiving messaging project requests and processing the messaging projects according to embodiments of the present invention. In embodiments, one or more incoming requests 765 from clients/customers of the scalable message delivery system 700 are received at the DNS server or servers 755, which checks its DNS records to identify which messaging systems 705 are available (805). In embodiments, requests are returned (810) from the DNS servers indicating to which messaging system (e.g., 705-1 or 705-2) the incoming messaging project or campaign should be routed. The message requests are then delivered (815) to the appropriate messaging system via a network connection such as the Internet 740. For example, incoming request 765-a may be sent to messaging system 705-1 and incoming request 765-b may be sent to messaging system 705-2. In embodiments, the DNS notes if a messaging system is down, overloaded, or offline and will not route incoming requests to that messaging system. For example, if a messaging system response to the DNS is not timely (late or non-existent), the DNS can change the status of that messaging system to offline, slow, or overloaded, as the case may be.

Having received an incoming request 765 for a messaging project, a messaging system 705 performs (820) a lookup for resource(s). In embodiments, the lookup may be done via the message generator 715 via the dynamic server manager 724; alternatively, the lookup may be performed directly via the dynamic server manager 727. In embodiments, the lookup is sent to the dynamic server manager of the datacenter that received the incoming request. For example, the lookup for resources for request 765-a (which was sent to messaging system 705-1) is made to dynamic server manager 724-1. The dynamic server manager identifies resources within the message generator and message delivery system 710 that may be used for processing messages for the messaging project. In embodiments, the dynamic server manager preferentially returns resources that are within the same datacenter or locations.

In embodiments, each dynamic server manger 724 updates the other dynamic server mangers in the message delivery system 700 via a network connection, such as the Internet, with the current status of resources available within the datacenter in which it resides. One skilled in the art shall recognize that a number of ways exists that the resources may update each other including but not limited to having a ring structure, tree structure, central hub, and so forth.

In embodiments, messages are then formed and delivered (825) via one or more message generators 715 and one or more message delivery systems 710. According to embodiments, in the normal course of operations, messaging system 705-1 uses message delivery system 710-1 to distribute its messages, and messaging system 705-2 uses message delivery system 710-2 to distribute its messages. However, in embodiments, should messaging system 705-1 discovery via the dynamic server manager 724-1 that the message delivery system 710-1 is overloaded or unavailable, it is able to communicate instead with message delivery system 710-2 for delivery of messages (and similarly for messaging system 705-2). In this manner, messaging loads traffic can be load balanced across two or more datacenters.

One skilled in the art shall recognize a number of ways in which load balancing may be performed, including but not limited to, statistical load balancing and/or using learned patterns. For example, by way of illustration and not limitation, a statistical load balancing may involve dividing the load evenly across the resources (e.g., if there are 100 messages and 5 queues each gets 20 messages). However, in some instance, such as with small volumes, the first queue may get them all messages due to message batch/block sizes (e.g., message batch is 100 or 1000 messages). It shall be noted that benefits of embodiments of the present invention allow for load balancing within a messaging system instance (intra-system load balancing), across messaging system instances (inter-system load balancing), or both.

In embodiments, additional information may be stored and shared between different instances of the messaging system at different locations. For example, in embodiments, account login credentials, performance metrics, and/or summary statistics (e.g., summaries of data that provide an explanation of what events (for example, message deliveries) occurred) may be stored in the data and log storage systems and shared between messaging systems.

Figure 9:
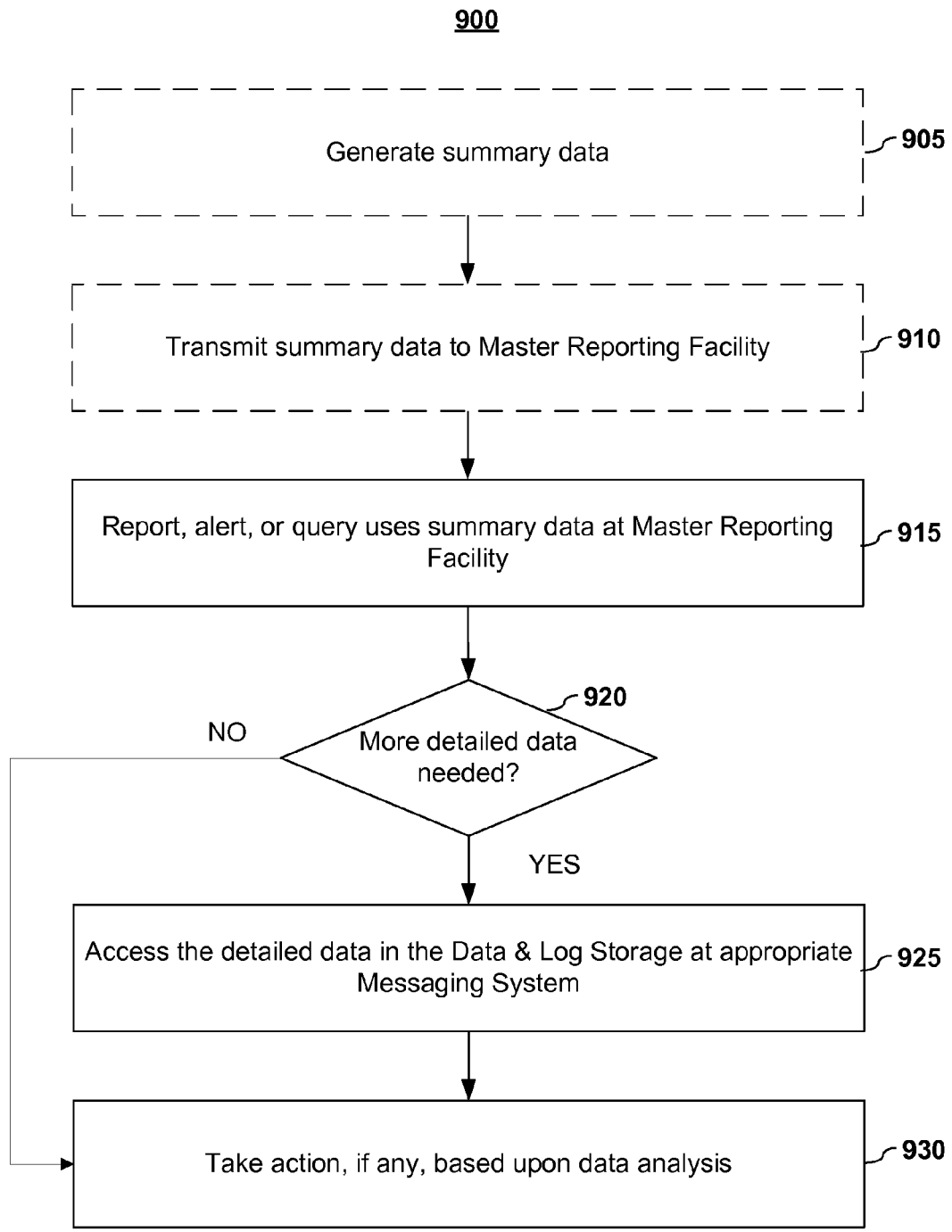
FIG. 9 depicts a method for centrally monitoring performance of various messaging systems instances in a scalable message system using summarizes of data according to embodiments of the present invention.

It shall be noted that the lack reliability and unknown performance of cloud infrastructures makes command and control of multiple clouds/datacenter (especially when trying to manage shifting messaging loads, load balancing, scaling up and down resources, and having to route around failures) extremely difficult. It is impractical, if not impossible, to keep the massive amounts of detailed information created as part of the messaging campaigns (e.g., the "event streams") in sync across arbitrary Internet connections. To address these issues, in embodiments, the scalable message delivery system 700 comprises a master reporting facility (MRF) 760, which receives summary, or "roll up", data from messaging systems 705-*x*. In embodiments, the MRF 760 contains summary, or roll up, data from all facilities but contains no detailed information. Examples of summaries, or roll up data, include but are not limited to summaries of log data, such as message counts and number of errors. In embodiments, the data also includes a source identifier that indicates from which facility the summary originated. Using reports based on summaries allows the systems to be kept in sync and monitored, and when more detailed forensic data is desired, a system administrator or other user can access the originating messaging system 705 to read the raw logs or event stream for that messaging system 705. Thus, key data is available for reporting and alerting almost immediately, when desired, but the system does not need to send all the raw data, which is vast and constantly changing, over unreliable and unknown performance Internet connections. FIG. 9 depicts a method for centrally monitoring performance of various messaging systems instances in a scalable message system using summarizes of data according to embodiments of the present invention.

As depicted in FIG. 9, the various messaging systems generate (905) summary data (905). In embodiments, analytics engine 123 may be part of data & log storage 702 and may apply business logic configured by a system administrator, a customer/client, or both to generate the specific summaries, or roll up data. This summary data is transmitted (910) to the master reporting facility. In embodiments, the data may be compressed, encrypted, or both. In embodiments, steps 905 and 910 are background processes that are continuously performed or performed according to a schedule or set of rules. When a report or alert that uses the summary data triggers (920) a desire for more detailed data, the detailed data may be accessed (925) in the data store at the appropriate messaging system using the source identifier associated with the summary data. Depending upon the data analysis, whether the summary data or the detailed data, the system, a system administrator, or a client may take (930) appropriate action.

One skilled in the art shall also recognize that the MRF 760 provides a central resource for summary reporting, charting, and dashboards for internal use and customer use, as well as alerting on key factors. Thus, using the MRF and summary data, reporting and alerting functions for system administrators and for clients may be done without the need for dedicated high-speed connections.

D. Security

It shall be noted that embodiments of the present invention may include providing security. Security may be provided at system levels and at account levels, and to data both in transit between resources and datacenters and to stationary data in datacenters.

Examples of data security include implementing one or more of the following procedures to manage security risk: (1) encrypting data when it is transmitted; (2) requiring user authentication and read only tracking (which may be summarized and available to at the MRF, at each facility, or both); (3) command line logging, wherein the commands that were run by any logged-in user are monitored and recorded; and (4) encryption of stored data (i.e., where data is stationary, it is encrypt in place), which protects against data theft from stationary data.

In embodiments, to protect against malicious attack, at a system level, one or more of the following procedures may be implemented to manage security risk. First, border controls may be implemented that include keeping a Network Address Translation (NAT) and Source NAT (SNAT) hot/cold failover system between the Internet and system servers. In embodiments, scalable message delivery servers may have only internal IP addresses and only via up to Layer 7 OSI model rules can traffic traverse to or from the Internet. For example, the system administrator may chose a source IP address, a timeframe, protocol, first X (e.g., 50) bytes of the packets must all match a pre-defined set or a rule blocks any communication to or from the system servers. Second, in embodiments, secondary controls with iptables and ip6tables may be employed— this means that even if the network devices are compromised, the systems resist intrusion as they themselves only allow certain IP addresses and protocols to communicate. In embodiments, even within the message delivery system network, only certain servers may be allowed to communicate to other servers. Finally, in embodiments, the system is configured to disable all unnecessary services and provide access control wherever possible within each application.

In embodiments, to provide security at an account level, one or more of the following procedures may be implemented. First, a client account may be monitored for patterns, errors, or anomalies. Second, the system may be configured to ensure that only certain groups of users have access to any services or systems. Third, command line stream and login patterns may be analyzed to help alert when there is unauthorized or unexpected logins and/or commands which would likely indicate that data theft is imminent.

Presented are some examples of security embodiments; however, one skilled in the art shall recognize additional methods and systems that may be employed to secure the system and data, which systems and methods shall be considered part of this disclosure.

E. Computing System Implementations

In embodiments, a computing system may be configured to perform one or more of the methods, functions, and/or operations presented herein. Systems that implement at least one or more of the methods, functions, and/or operations described herein may comprise a mass messaging application or applications operating on a computer system. The computer system may comprise one or more computers and one or more databases. The computer system may be a distributed system or a cloud-based computer system.

It shall be noted that the present invention may be implemented using one or more instruction-execution/computing devices or systems capable of processing data, including, without limitation phones, laptop computers, desktop computers, and servers. The present invention may also be implemented into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 10:
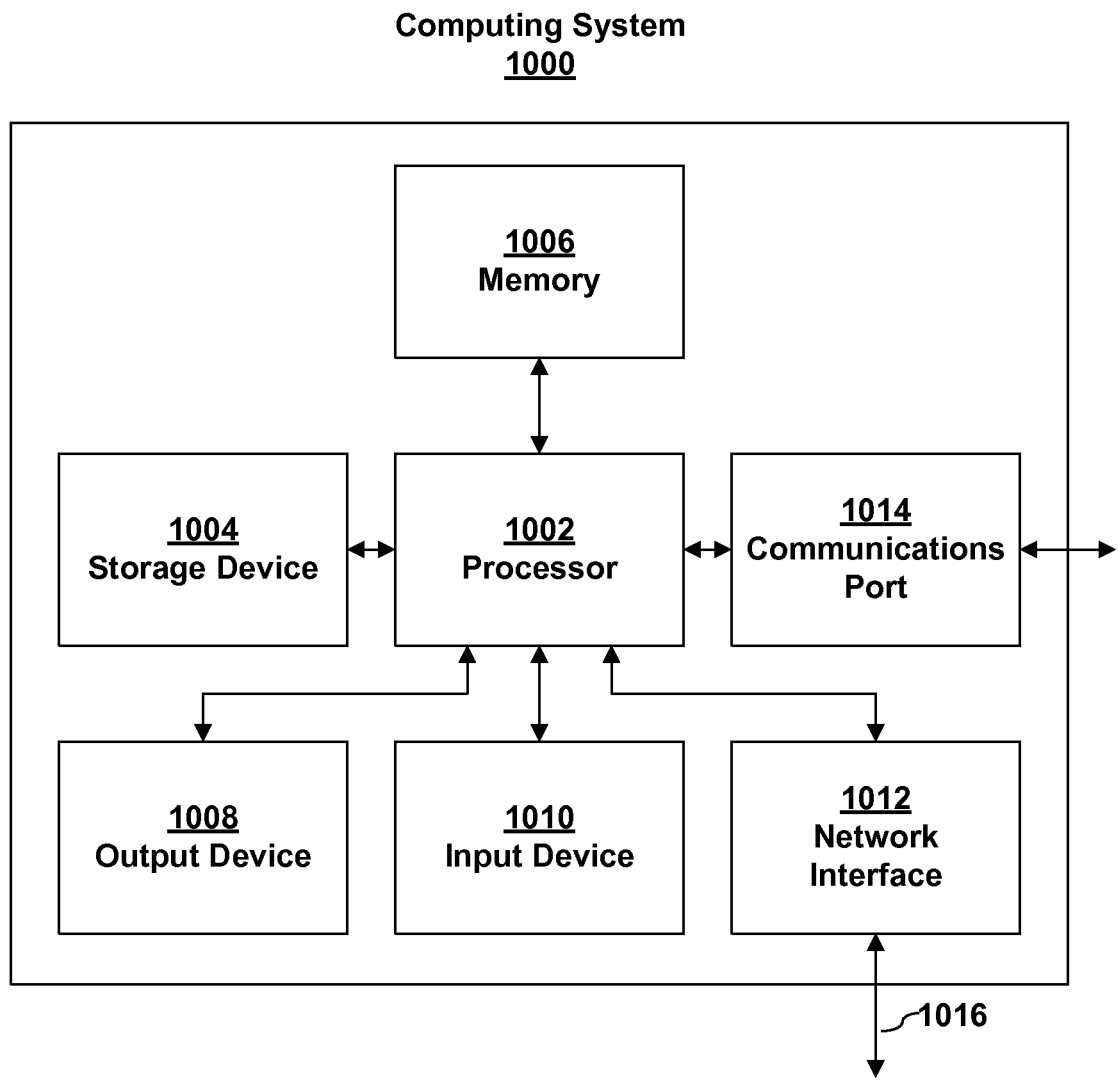
FIG. 10 depicts a block diagram of an example of a computing system according to embodiments of the present invention.

FIG. 10 depicts a functional block diagram of an embodiment of an instruction-execution/computing device 1000 that may implement or embody embodiments of the present invention, including without limitation a client and a sever. As illustrated in FIG. 10, a processor 1002 executes software instructions and interacts with other system components. In an embodiment, processor 1002 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1004, coupled to processor 1002, provides long-term storage of data and software programs. Storage device 1004 may be a hard disk drive and/or another device capable of storing data, such as a magnetic or optical media (e.g., diskettes, tapes, compact disk, DVD, and the like) drive or a solid-state memory device. Storage device 1004 may hold programs, instructions, and/or data for use with processor 1002. In an embodiment, programs or instructions stored on or loaded from storage device 1004 may be loaded into memory 1006 and executed by processor 1002. In an embodiment, storage device 1004 holds programs or instructions for implementing an operating system on processor 1002. In one embodiment, possible operating systems include, but are not limited to, UNIX, AIX, LINUX, Microsoft Windows, and the Apple MAC OS. In embodiments, the operating system executes on, and controls the operation of, the computing system 1000.

An addressable memory 1006, coupled to processor 1002, may be used to store data and software instructions to be executed by processor 1002. Memory 1006 may be, for example, firmware, read only memory (ROM), flash memory, non-volatile random access memory (NVRAM), random access memory (RAM), or any combination thereof. In one embodiment, memory 1006 stores a number of software objects, otherwise known as services, utilities, components, or modules. One skilled in the art will also recognize that storage 1004 and memory 1006 may be the same items and function in both capacities. In an embodiment, one or more of the methods, functions, or operations discussed herein may be implemented as modules stored in memory 1004, 1006 and executed by processor 1002.

In an embodiment, computing system 1000 provides the ability to communicate with other devices, other networks, or both. Computing system 1000 may include one or more network interfaces or adapters 1012, 1014 to communicatively couple computing system 1000 to other networks and devices. For example, computing system 1000 may include a network interface 1012, a communications port 1014, or both, each of which are communicatively coupled to processor 1002, and which may be used to couple computing system 1000 to other computer systems, networks, and devices.

In an embodiment, computing system 1000 may include one or more output devices 1008, coupled to processor 1002, to facilitate displaying graphics and text. Output devices 1008 may include, but are not limited to, a display, LCD screen, CRT monitor, printer, touch screen, or other device for displaying information. Computing system 1000 may also include a graphics adapter (not shown) to assist in displaying information or images on output device 1008.

One or more input devices 1010, coupled to processor 1002, may be used to facilitate user input. Input device 1010 may include, but are not limited to, a pointing device, such as a mouse, trackball, or touchpad, and may also include a keyboard or keypad to input data or instructions into computing system 1000.

In an embodiment, computing system 1000 may receive input, whether through communications port 1014, network interface 1012, stored data in memory 1004/1006, or through an input device 1010, from a scanner, copier, facsimile machine, or other computing device.

In embodiments, computing system 1000 may include one or more databases, some of which may store data used and/or generated by programs or applications. In embodiments, one or more databases may be located on one or more storage devices 1004 resident within a computing system 1000. In alternate embodiments, one or more databases may be remote (i.e., not local to the computing system 1000) and share a network 1016 connection with the computing system 1000 via its network interface 1014. In various embodiments, a database may be a relational database, that is adapted to store, update, and retrieve data in response to SQL-formatted commands.

One skilled in the art will recognize no computing system or programming language is critical to the practice of the present invention. One skilled in the art will also recognize that a number of the elements described above may be physically and/or functionally separated into sub-modules or combined together.

It shall be noted that embodiments of the present invention may further relate to computer products comprising one or more non-transitory computer-readable media that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A scalable messaging system for distributing messages comprising:
 a customer interface module that facilitates receiving of requests from and providing information to a customer;
 a data layer system comprising one or more databases that comprise data and log information of the scalable messaging system;
 a dynamic server manager that contains a listing of resources within the scalable messaging system that should be available for use in generating messages, distributing messages, or both;
 a message delivery system comprising:
  a message data store system comprising:
   an address data store for storing address information for message recipients for a messaging campaign; and a message store that stores one or more message templates for the messaging campaign;

a message abstraction system that performs pre-processing of messages for the message campaign by retrieving addresses and one or more message templates from the message data store system and generates queued messages, each pre-processed, queued message having an associated message type; and one or more message servers that receive the pre-processed, queued messages from the message abstraction system specific to the message type of the message server, forms messages of proper format for the message type, and distributes the messages, the message abstraction system and pre-processed, queued messages allowing the one or more message servers to operate asynchronously from the message data store system.

2. The scalable messaging system of claim 1 wherein the dynamic server manager is further configured to monitor performance-related data of the scalable messaging system to control how many of what types of message abstraction system resources, messages servers, or both should be in existence to balance system performance relative to costs.

3. The scalable messaging system of claim 2 wherein the dynamic server manager determines how many message abstraction system resources should be in existence by performing the steps comprising:
monitoring loading of the message abstraction system;
responsive to the loading being above an overloaded threshold, creating another resource to assist in processing; and
responsive to the loading being under an underutilized threshold, shutting down one or more resources.

4. The scalable messaging system of claim 2 wherein the dynamic server manager determines how many message servers should be in existence by performing the steps comprising:
monitoring loading of the one or more message servers;
responsive to the loading of a set of message servers of a particular message type being above an overloaded threshold, creating another message server of that message type to assist in message processing; and
responsive to the loading of a set of message servers of a particular message type being under an underutilized threshold, shutting down at least one of the message servers of that message type.

5. The scalable messaging system of claim 2 wherein the dynamic server manager controls how many of what types of message abstraction system resources, messages servers, or both should be in existence via a command and control component in each of the message abstraction system resources and messages servers.

6. The scalable messaging system of claim 1 wherein the message data store system further comprises:
a destination blacklist comprising information related to recipients that should not be contacted or cannot be contacted, wherein the message abstraction system checks addresses of a messaging campaign against the destination blacklist to remove any recipients that are listed in the destination blacklist.

7. The scalable messaging system of claim 1 wherein the pre-processed, queued message generated by the message abstraction system can support a plurality of messaging types.

8. The scalable messaging system of claim 1 wherein the one or more message servers and at least some of the message abstraction system resources each comprise a data queue module, and a message server requests pre-processed, queued messages from the message abstraction system via data queue modules.

9. The scalable messaging system of claim 8 wherein the pre-processed, queued messages requested by a message server represent a block of recipient addresses and a message template of a message type thereby reducing data that needs to be conveyed between the message server and the message abstraction system.

10. The scalable messaging system of claim 8 wherein the pre-processed, queued messages includes a quality-of-service identifier to facilitate preferential message processing.

11. The scalable messaging system of claim 1 further comprising:
a master reporting facility, for providing a centralized resource for reporting, that receives summaries of data from the scalable messaging system, the scalable messaging system being one of a plurality of messaging systems.

12. A scalable message delivery system for distributing messages comprising:
a plurality of messaging systems at a plurality of datacenters, each messaging system comprising:
a dynamic server manager that contains a listing of resources within the scalable message delivery system that should be available for use;
a message generator that:
responsive to receiving a messaging project to distribute a set of messages, identifies resources to use for the messaging project by querying the dynamic server manager;
generates messages for the messaging project using at least some of the identified resources; and
delivers the generated messages to a messaging system for distribution; and
a message delivery system that receives generated messages from the message generator and uses the generated messages to distribute messages for receipt by message recipients; and
a master reporting facility, for providing a centralized resource for reporting, that receives summaries of data from the plurality of messaging systems about message delivery activities.

13. The system of claim 12 wherein a dynamic server manager is configured to perform the steps comprising:
monitoring availability of resources for its messaging system;
updating the availability of resources at its messaging system to at least one other dynamic server manager at least one other datacenter; and
receiving updates of availability of resources at other messaging systems from at least one other dynamic server.

14. The system of claim 12 wherein a messaging system is configured to perform the steps:
responsive to the messaging system identifying via its dynamic server manager that its message delivery system is unavailable or overloaded:
using its dynamic server manager to identify a message delivery system of a different messaging system; and
submitting its generated messages to the message delivery system of the different messaging system for distribution.

15. The system of claim 12 wherein a summary of data comprises:
a set of at least some of: performance metrics, summaries of log data, message counts, and number of errors; and an identifier that associates the summary of data with a messaging system for which the summary of data pertains.

16. The system of claim 15 further comprising:
responsive to wanting to access more detailed information not provided in a summary of data, querying a data storage for the messaging system associated with the summary of data.

17. The system of claim 13 wherein a message generator comprises:
one or more application servers that generates access addresses from an address data store and one or more message templates from a message data store and that generates queuing engine messages; and
one or more queuing engines that queue the queuing engine messages for the a message delivery system, the one or more application servers and the one or more queuing engines forming a message abstraction system that allows a message delivery system to operate asynchronously from the address data store and the message data store.

18. A computer-implemented method for providing message delivery in a scalable messaging system comprising:
creating a message abstraction layer between message data store comprising an address data store that stores address information for message recipients for a messaging campaign and a message store that stores one or more message templates for the messaging campaign and one or more message server resources that allows the one or more message servers resources to operate asynchronously from the message data store by performing the steps comprising:
generating a queuing engine message from an address data store that stores address information for message recipients for a messaging campaign and a message store that stores one or more message templates for the messaging campaign, the queuing engine message representing a set of message recipients and a message template for a specific messaging type; and
placing one or more queuing engines messages into one or more queues to await processing by a messaging server resource;
monitoring performance-related data of the scalable messaging system to control how many of what types of resources should be in existence to balance system performance according to metrics and maintain a listing of resources within the scalable messaging system that should be available for use;
responsive to a performance-related metric being above an overloaded threshold, creating another resource to assist in processing; and
responsive to a performance-related metric being under an underutilized threshold, shutting down one or more resources.

19. The computer-implemented method of claim 18 wherein the queued message is abstracted to be similar across messaging types.

20. The computer-implemented method of claim 18 further comprising:
summarizing log data related to the scalable messaging system; and
providing the summarized log data to a master reporting facility that provides a centralized resource for reporting, wherein the scalable messaging system is one of a plurality of scalable messaging systems that provide summarized log data to the master reporting facility.

* * * * *